United States Patent [19]

Schulte

[11] Patent Number: 4,616,575
[45] Date of Patent: Oct. 14, 1986

[54] METHOD AND APPARATUS FOR THE HEAT TREATMENT OF FINE-GRAINED MATERIAL

[75] Inventor: Hans-Gerd Schulte, Bergkamen, Fed. Rep. of Germany

[73] Assignee: Krupp Polysius AG, Beckum, Fed. Rep. of Germany

[21] Appl. No.: 776,583

[22] Filed: Sep. 16, 1985

[30] Foreign Application Priority Data

Oct. 25, 1984 [DE] Fed. Rep. of Germany ....... 3439129

[51] Int. Cl.$^4$ .............................................. F23J 15/00
[52] U.S. Cl. ..................................... 110/345; 55/315; 55/343; 55/459 R; 110/216; 432/58; 432/106
[58] Field of Search ............... 110/203, 204, 216, 218, 110/341, 345; 55/315, 317, 341 R, 345, 343, 459 R, DIG. 25; 432/58, 106

[56] References Cited

U.S. PATENT DOCUMENTS

| | | | |
|---|---|---|---|
| 2,724,904 | 11/1955 | Gordon | 55/315 X |
| 2,733,909 | 2/1956 | Engelhart | 432/58 X |
| 3,146,998 | 9/1964 | Golucke et al. | 432/58 X |
| 3,234,716 | 2/1966 | Sevih et al. | 55/317 |
| 3,884,620 | 5/1975 | Rammler | 432/58 X |
| 4,226,585 | 10/1980 | Deussner | 432/58 X |
| 4,505,051 | 3/1985 | Herchenbach et al. | 432/58 X |

FOREIGN PATENT DOCUMENTS

2307773 11/1976 France ................................ 432/106

*Primary Examiner*—Albert J. Makay
*Assistant Examiner*—Steven E. Warner
*Attorney, Agent, or Firm*—Learman & McCulloch

[57] ABSTRACT

A method and apparatus for the heat treatment of fine-grained material wherein the degree of efficiency of the last cyclone of a multi-cyclone preheater preceding a filter is reduced in the finest grain size range and at least a proportion of the filter dust deposited in the filter is passed directly to the calciner. In this way material is prevented from caking and flowing in batches in the apparatus.

15 Claims, 1 Drawing Figure

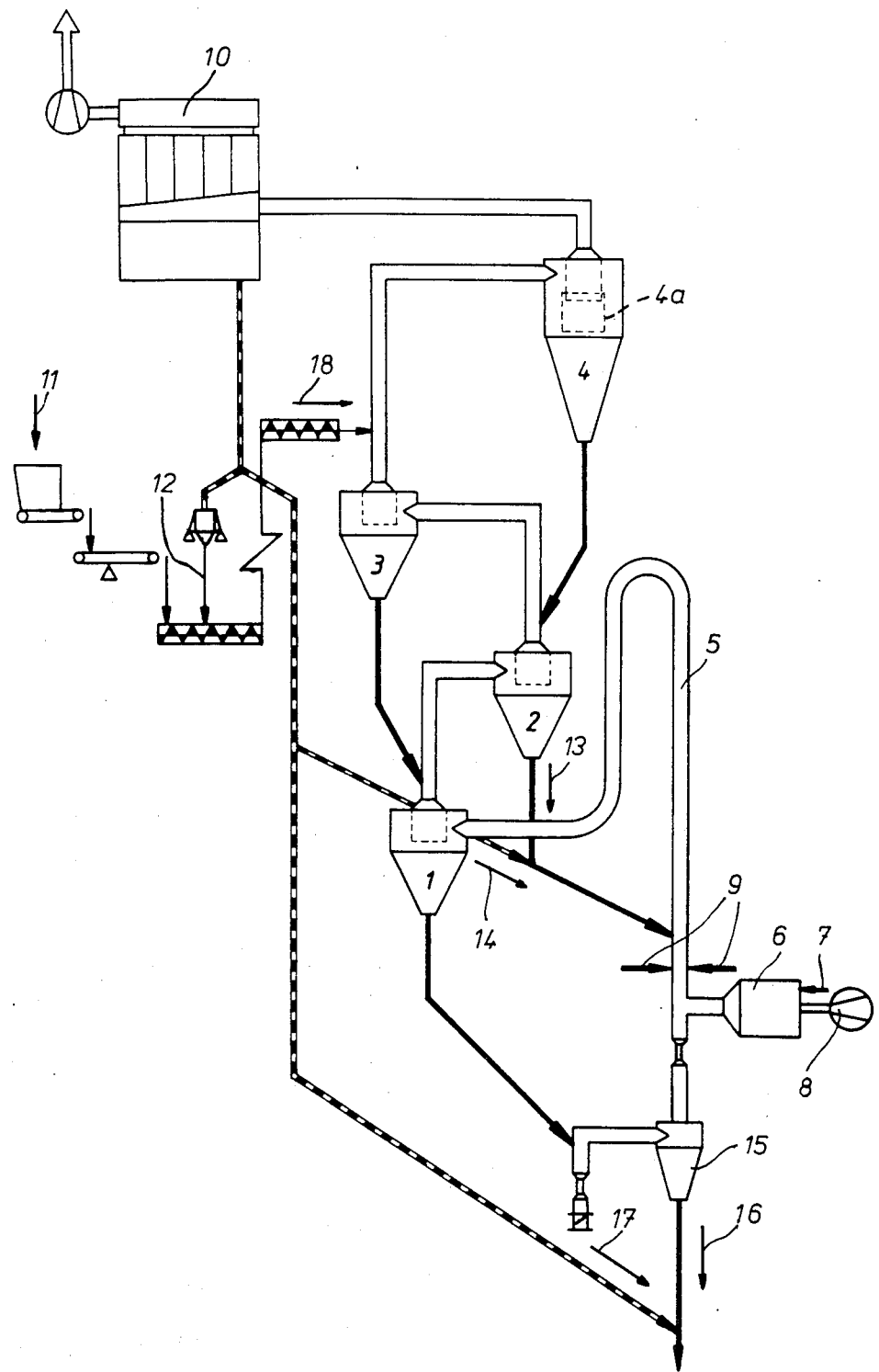

METHOD AND APPARATUS FOR THE HEAT TREATMENT OF FINE-GRAINED MATERIAL

The invention relates to a method for heat treating fine-grained material such as lime and dolomite and to apparatus for practicing the method.

BACKGROUND OF THE INVENTION

Certain types of fine-grained material, particularly certain types of lime and dolomite, have poor flow properties, especially in the ground state in which there is a high proportion of very fine material. The poor flow properties are especially prevalent in the case of soft types of limestone such as chalk or marly raw materials, and also in materials which decrepitate (i.e., disintegrate) in the firing process. The flow properties can be improved to some extent by coarser grinding. However, if the material has a tendency to decrepitation, the proportion of fine material builds up when the filter dust is delivered together with the fresh material to the hot gas pipe which leads to the last (uppermost) cyclone of a multi-stage cyclone preheater. Considerable operational disruptions then occur after a short time as a result of caking in the upper cyclones or because of the material flowing in batches through the apparatus. While in undisrupted normal operation the quantity of filter dust is approximately 5 to 10% of the quantity of fresh material, in materials which tend to break down into fine grains during calcination the filter dust can build up to over 40%. This gives rise to the poor flow properties of the material mentioned above, caking in the pipes, powder chutes and cyclones, and overloading of the upper cyclone stages. Under these conditions it is no longer possible for smooth operation to be maintained.

The object of the invention, therefore, is to provide a heat treatment method and apparatus in which satisfactory operation, without material caking and without material flowing in batches, is ensured even in the heat treatment of fine material which in the ground state has poor flow properties and/or has a tendency to decrepitation in the firing process.

SUMMARY OF THE INVENTION

According to the invention the degree of efficiency of the last cyclone of the preheater before the filter is reduced in the finest grain size range, i.e., deliberately worsened, and the finest-grained proportion of the fresh material passes directly into the filter, bypassing the warmer stages of the preheater. Then, according to the invention, a proportion of the filter dust deposited in the filter is delivered directly to the calciner, i.e., bypassing the preheater.

By the combination of these two features it can be ensured that material does not cake or flow in batches in the apparatus.

Depending upon the given circumstances, either all of the filter dust deposited in the filter or only a proportion thereof is delivered directly to the calciner. In materials which are easily calcined, in which higher residual losses on ignition (of for example 3 to 5%) can be allowed, it is also preferable for a proportion of the filter dust deposited in the filter to be mixed together with the finished material after the cooling stage.

THE DRAWING

The drawing is a schematic illustration of apparatus especially adapted to perform the method according to the invention.

DETAILED DESCRIPTION

The illustrated apparatus contains cyclones 1, 2, 3, and 4 of which the cyclones 2, 3 and 4 form a multistage cyclone preheater for preheating the material with hot exhaust gases from a calciner 5. The calciner 5 is supplied on the one hand with combustion gases via a combustion chamber 6 (with fuel supply 7 and air supply through a blower 8) and on the other hand with additional fuel via burners 9. The cyclone 1 serves for separating off the material fired in the calciner 5.

The four cyclones 1, 2, 3, and 4 are connected via their gas and material pipes in the manner shown in the drawing. A filter 10 communicates with the uppermost cyclone 4. Some of the filter dust from the filter 10 can be mixed (by means of known regulating devices which are not shown) with fresh material delivered at 11 (arrow 12), some can be delivered (arrow 14) to the calciner 5 together with the material (arrow 13) discharged from the cyclone 2, and some can be mixed (arrow 17) directly with finished material after leaving a cooling stage 15 (arrow 16). The material (arrow 18) consisting of fresh material (arrow 11) and a proportion of filter dust (arrow 12) is delivered to the gas pipe leading from the cyclone 3 to the cyclone 4.

The cyclone 1 communicating with the calciner 5 is constructed as a high-powered cyclone in cases in which excessive quantities of fine dust are formed in the calciner itself by abrasion of the calcined material which is often soft or by decrepitation. This fine-grained dust can be carried off out of the calciner with the hot gases into the upper cyclone stages and can there lead to material caking or flowing in batches. When a high-powered cyclone is used the fine dust occurring in the calciner is separated off to a tolerable residual quantity.

The uppermost cyclone 4 preceding the filter 10 is by contrast so constructed (for example, provided with a dip pipe 4a the position of which can be varied) that its degree of efficiency in the finest grain size range can be deliberately worsened. The separation limit of this uppermost cyclone 4 can be adjusted for example from 20 $\mu$m to any value between 30 and 80 $\mu$m, preferably 40 to 60 $\mu$m, and most preferably approximately 50 $\mu$m.

The material delivered to the apparatus at 18 is preheated in the multi-stage cyclone preheater with the hot exhaust gases from the calciner 5 before it enters the calciner 5 (after separation in the cyclone 2) and is fired there. After separation in the cyclone 1 the fired material enters the cooling stage 15.

As a result of the deliberate worsening of the degree of efficiency of the cyclone 4 in the finest grain size range, the proportion of the fresh material having the finest grains (arrow 11) and the proportion of the filter dust optionally returned at 12 are delivered with the exhaust gases from the cyclone preheater to the filter 10. At least a proportion of the filter dust deposited in the filter 10 is delivered directly to the calciner 5 at 14 and thus relieves the cyclone preheater. Further quantities of the filter dust can be added at 12 to the fresh material or at 17 to the finished material.

The invention will now be explained further with the aid of two examples. For the tests which are described below a semi-industrial suspended gas calcining apparatus was used consisting of three preheating cyclones and a calciner with integral cyclone separator. The calcined material was cooled in a cyclone cooler. The uppermost cyclone of the three-stage preheater was designed as a high-powered cyclone which only had a reduced degree of separation in the smallest grain size range below 20 μm.

EXAMPLE 1

A chalky limestone was used which because of its fine-grained nature had in the past been considered a waste material which could not be utilized.

| Grain Analysis (% by Weight) | Material Delivered (%) | Calcined Material (%) |
|---|---|---|
| >100 μm | 18.8 | 13.0 |
| >63 μm | 34.5 | 21.6 |
| >40 μm | 50.4 | 28.7 |
| >32 μm | 59.0 | 33.2 |

(a) The apparatus was initially operated in the conventional manner with all of the filter dust being delivered to the apparatus together with the fresh material.

The desired residual $CO_2$ content of <0.5% was achieved at a temperature of 1040° C. in the calciner. Because of its low grain size stability, during its passage through the suspended gas heat exchanger the chalky lime formed considerable quantities of fine-grained dust. The dust formation was very high particularly in the calciner region during the expulsion of the $CO_2$.

The operation of the calcining apparatus was considerably disrupted by the proportion of grains already contained in the fresh material having a grain size below 50 μm and by the ever increasing proportion of filter dust. After a short time the continuous flow of material in the apparatus changed into a flow of material in batches. Then as the proportion of fine material increased, after approximately 3 hours of operation the first blockages occurred in the cyclone hoppers and in the powder chutes. It was possible to remove these by means of compressed air lances, but they recurred after increasingly shorter intervals of time until it was no longer possible to maintain continuous operation.

(b) Then the apparatus was operated using the method according to the invention. Initially the filter dust was not returned to the apparatus with the fresh material but was led into the calciner via the powder chute located below the cyclone 2 (cf. the drawing). This resulted in a considerable improvement in the situation, but the proportion of fine material smaller than 50 μm introduced with fresh material and not completely sifted out in the uppermost cyclone stage, i.e., largely deposited, caused an undesirable flow of material in batches through the apparatus. Thereupon the degree of efficiency of the uppermost cyclone was deliberately worsened by altering the dip pipe position in the finest grain size range so that the proportion of the material delivered having the finest grains smaller than 50 μm was almost completely sifted out and transported with exhaust gas into the filter (thus the separation limit was changed from approximately 20 μm to approximately 50 μm).

The finest dust being increasingly formed in the calcining region was carried off in considerable quantity to the cyclone 2 and in a smaller quantity to the cyclone 3. High dust circulation was set up between the cyclones 1 to 3 which finally led to further blockages in the cyclone cones and powder chutes. Then as a further counter-measure the cyclone 1 was replaced by a high-powered cyclone which only allowed a small tolerable proportion of finest dust to pass into the upper cyclone stages.

Because of these measures, even with very difficult material, it was possible to achieve abrasion-free operation.

EXAMPLE 2

A dolomite of the grain composition set out below as calcined at 1120° C. and a residual $CO_2$ content of less than 1% was achieved.

| Grain Analysis | Material Delivered (%) | Calcined Material (%) |
|---|---|---|
| >100 μm | 10.8 | 0.5 |
| >63 μm | 30.2 | 7.5 |
| >40 μm | 46.0 | 19.1 |
| >32 μm | 56.3 | 28.8 |

Since the strong tendency of dolomite to decrepitation during thermal decomposition was known, a high-powered cyclone was used as the cyclone 1 for separating off the calcined material.

With the predetermined fineness of grain the dolomite had very poor flow properties in all phases of the heat treatment. Very uneven operation occurred because the material flowed in batches. This led to marked fluctuations in the calcining temperature as a result of which variations occurred in the residual $CO_2$ content of the calcined material from 0.3 to 5.5%. Cyclone blockages did not occur.

Studies using special laboratory tests showed that by reducing the proportion of grains <40 μm from originally 56% to approximately 25% the flowing capability of the dolomite powder could be improved to the necessary extent. By alteration of the position of the dip pipe of the cyclone 4 the partial sifting out was achieved and at the same time the quantity of filter dust returned with the fresh material to the apparatus was limited to 15% (based on the quantity of fresh material). The excess filter dust was delivered directly to the calciner.

What is claimed is:

1. In a method for heat treating fine-grained material, such as lime and dolomite, wherein:
    (a) the material is preheated in a multi-stage cylone preheater in heat exchange with exhaust gases from a calciner,
    (b) then fired in the calciner,
    (c) and then cooled in a cooling stage, and
    (d) wherein dust is removed from the exhaust gases by a filter and such dust is returned to the apparatus, the improvement comprising
    (e) reducing the degree of efficiency of the last cyclone of the preheater preceding the filter in such manner that the finest-grained proportion of the material delivered to said last cyclone and lying below a selected grain size passes with the exhaust gas to the filter;
    (f) delivering at least some of the filter dust directly to the calciner; and
    (g) further decreasing the degree of efficiency of said last cyclone and increasing the quantity of filter dust delivered directly to the calciner to such an extent that said material neither cakes nor flows in batches.

2. The method according to claim 1 including subjecting the exhaust gases from the calciner to high-powered sifting in the subsequent cyclone.

3. The method according to claim 1 including delivering all of the filter dust directly to the calciner.

4. The method according to claim 1 including delivering a portion of the filter dust together with fresh material to said last cyclone.

5. The method according to claim 1 including mixing a portion of the filter dust with finished material following the cooling stage.

6. The method according to claim 1 wherein said last cyclone has an adjustable dip pipe and wherein the degree of efficiency of said last cyclone is varied by altering the position of the dip pipe.

7. The method according to claim 1 including setting said last cyclone to a separation limit between about 30 and 80 μm.

8. The method according to claim 1 including setting said last cyclone to a separation limit between about 40 and 60 μm.

9. In apparatus for heat treating fine-grained material having:
   (a) a multi-stage cyclone preheater for preheating the material,
   (b) a calciner for firing the preheated material and having its exhaust in communication with said preheater for preheating said material,
   (c) a cyclone in communication with said calciner for separating off the fired material,
   (d) a cooling stage for cooling the fired material, and
   (e) a filter in communication with said cyclone preheater,
the improvement comprising:
   (f) means for adjusting the degree of efficiency of the last cyclone of the preheater preceding said filter;
   (g) means for delivering a portion of filter dust from the filter directly to the calciner; and
   (h) means for delivering another portion of said filter dust from said filter to finished material discharged from said cooling stage.

10. Apparatus according to claim 9, wherein said cyclone is a high-powered cyclone.

11. Apparatus according to claim 9 including means for delivering another portion of filter dust from said filter to said last cyclone.

12. Apparatus according to claim 9 including means for delivering other portions of said filter dust to said last cyclone and to finished material discharged from said cooling stage.

13. Apparatus according to claim 9 wherein the means for adjusting the degree of efficiency of said last cyclone comprises an adjustable dip pipe in said last cyclone.

14. In apparatus for heat treating fine-grained material having:
   (a) a multi-stage cyclone preheater for preheating the material,
   (b) a calciner for firing the preheated material and having its exhaust in communication with said preheater for preheating said material,
   (c) a cyclone in communication with said calciner for separating off the fired material,
   (d) a cooler for cooling the fired material and discharging such material,
   (e) a filter in communication with the last cyclone of said preheater,
   (f) and means for delivering relatively fine-grained material from said last cyclone to said filter,
the improvement comprising:
   (g) means for adjusting the degree of efficiency of said last cyclone and varying the proportions of relatively fine and relatively coarse material separated by said last cyclone;
   (h) means for returning a first portion of dust from said filter to said last cyclone; and
   (i) means for delivering a second portion of dust from said filter directly to said calciner.

15. Apparatus according to claim 14 including means for delivering a further portion of said dust from said filter to material discharged from said cooler.

* * * * *